United States Patent [19]

Cournoyer et al.

[11] 4,132,320
[45] Jan. 2, 1979

[54] PAN STACKING SYSTEM

[75] Inventors: George R. Cournoyer, Bridgeport; Robert E. Woody; John R. Baker, both of Saginaw, all of Mich.

[73] Assignee: Baker Perkins Inc., Saginaw, Mich.

[21] Appl. No.: 789,772

[22] Filed: Apr. 22, 1977

[51] Int. Cl.$^2$ .............................................. B65G 57/06
[52] U.S. Cl. ................................ 214/6 H; 214/6 DK; 214/6 TS; 271/192
[58] Field of Search ................ 214/6 H, 6 DK, 6 TS; 198/347, 358, 369; 271/189, 192

[56] References Cited

U.S. PATENT DOCUMENTS

| 3,101,851 | 8/1963 | Heide et al. | 314/6 H |
| 3,255,895 | 6/1966 | Klingler | 214/6 H |
| 3,420,386 | 1/1969 | Morrow et al. | 214/6 DK |
| 3,533,517 | 10/1970 | Heide | 214/6 DK |
| 3,591,020 | 7/1971 | Beninger et al. | 214/6 DK |
| 3,605,982 | 9/1971 | Adler | 198/358 |
| 3,675,791 | 7/1972 | Russell et al. | 214/6 DK |
| 3,770,143 | 11/1973 | Breitbach | 198/347 X |
| 3,971,481 | 7/1976 | Longenecker et al. | 214/6 DK X |

FOREIGN PATENT DOCUMENTS 1292078  4/1969  Fed. Rep. of Germany ....... 214/6 DK

Primary Examiner—L. J. Paperner
Attorney, Agent, or Firm—Learman & McCulloch

[57] ABSTRACT

Articles which nest, such as baking pans, are assembled into a stack by a two-stage lift mechanism in which the assembly of a second stack is commenced while a previously assembled first stack is being discharged from the stack forming apparatus, so that the flow of pans into the apparatus need not be interrupted. Articles such as pans are fed in succession into a stacking station at which the articles are aligned with a vertical path and then dropped. A first stage lift receives the articles and is lowered one step upon the receipt of each article until the first stage lift is lowered to a transfer station. At the transfer station, support of the stack of articles is transferred to a second stage lift which is similarly lowered one step upon the addition of each subsequent article to the stack until a preselected number of articles have been accumulated in the stack. Upon transferring the support of the stack to the second stage lift, the first stage lift is retracted clear of the stack and returned to its upper limit of movement. When the final article has been stacked on the second stage lift, the first stage lift is reinserted into the vertical path to receive the next following article to commence assembly of a second stack. Simultaneously, the second stage lift is lowered to a discharge station where the stack is discharged from the second stage lift which is then elevated back to the transfer station.

16 Claims, 12 Drawing Figures

PAN STACKING SYSTEM

BACKGROUND OF THE INVENTION

The present invention is especially adapted for assembling bakery pans into a stack in which each layer of the stack consists of a single pan. Typically, prior art apparatus for this purpose takes the form of an infeed conveyor which conveys pans in succession onto a lift which is indexed downwardly upon the receipt of each article until a stack is formed. The stack is then discharged from the lift, after which the lift is elevated to its upper limit of movement to commence the formation of the next stack. Because a certain amount of time is required to move the completed stack of pans clear of the lift and to subsequently return the lift to its upper limit of movement, it is necessary to interrupt the flow of pans to the lift while the two sequential operations are being performed.

The present invention has, as one object, the provision of a mechanism in which pans can be fed more rapidly and continuously into the stack forming apparatus without the necessity of interrupting the flow of pans during the stack discharge and lift return steps.

Another object of the invention is to provide a stacker which operates in conjunction with the demand for pans downstream in the bakery production line.

Prior art patents of possible interest are: U.S. Pat. Nos. 3,101,851; 3,897,877; 3,366,253; 3,837,140; 3,533,517; 3,429,459; 2,849,236; 2,414,059; 2,375,241; Canadian Pat. No. 543,070.

SUMMARY OF THE INVENTION

In accordance with the present invention, a stacking apparatus employs separate first and second stage lift mechanisms which operate respectively along the upper and lower portions of the vertical stacking path. The upper or first stage lift mechanism supports the pans upon supports which can be retracted clear of the stacking path when not in use. In the assembly of a stack of pans, the initial pans of the stack are assembled into a nested stack upon the supports of the first stage lift, which is lowered one step upon the receipt of each article. When a sufficient number of pans have been accumulated on the first stage lift to find the first stage lift lowered to a predetermined elevation, support of the stack of pans is transferred to a second stage lift which travels only along the lower portion of the vertical stacking path. When the stack of pans has been received by the second stage lift, the supports of the first stage lift can be retracted clear of the stack and the first stage lift is returned to its uppermost position with the supports retracted. During this time, subsequent pans are assembled into the stack supported on the second stage lift which, like the first stage lift, is lowered one step upon the receipt of each pan.

When a predetermined number of pans have been accumulated in the stack, the second stage lift is dropped to an article discharging position, while the supports of the first stage lift are shifted back into their operative position to receive the next subsequent pan. Assembly of the first portion of a second stack on the first stage mechanism is thus accomplished while the second stage mechanism is being lowered to its discharge position. The first assembled stack is then discharged from the second stage mechanism, and as soon as the stack clears the second stage mechanism, it is returned to its upper limit of movement to await receipt of the next partial stack from the first stage mechanism.

The diverter conveyor section includes a discharge end, which can be positioned to feed the pans into the stacking apparatus from which they proceed to storage, or to divert the articles to a bypass conveyor dependent on whether the pans are required downstream. The diverter conveyor is run at a somewhat higher speed than the infeed conveyor to create a separation between the articles. The discharged articles are received by a catcher mechanism which supports and guides the pans until they reach a stop plate, at which time the kinetic energy of the falling trailing end of the pan imparted to a cam section of the catcher mechanism actuates the catcher mechanism to release the pan to permit it to drop freely.

Other objects and features of the invention will become apparent by reference to the following specification and to the drawings.

IN THE DRAWINGS

GENERAL DESCRIPTION

Figure 1:
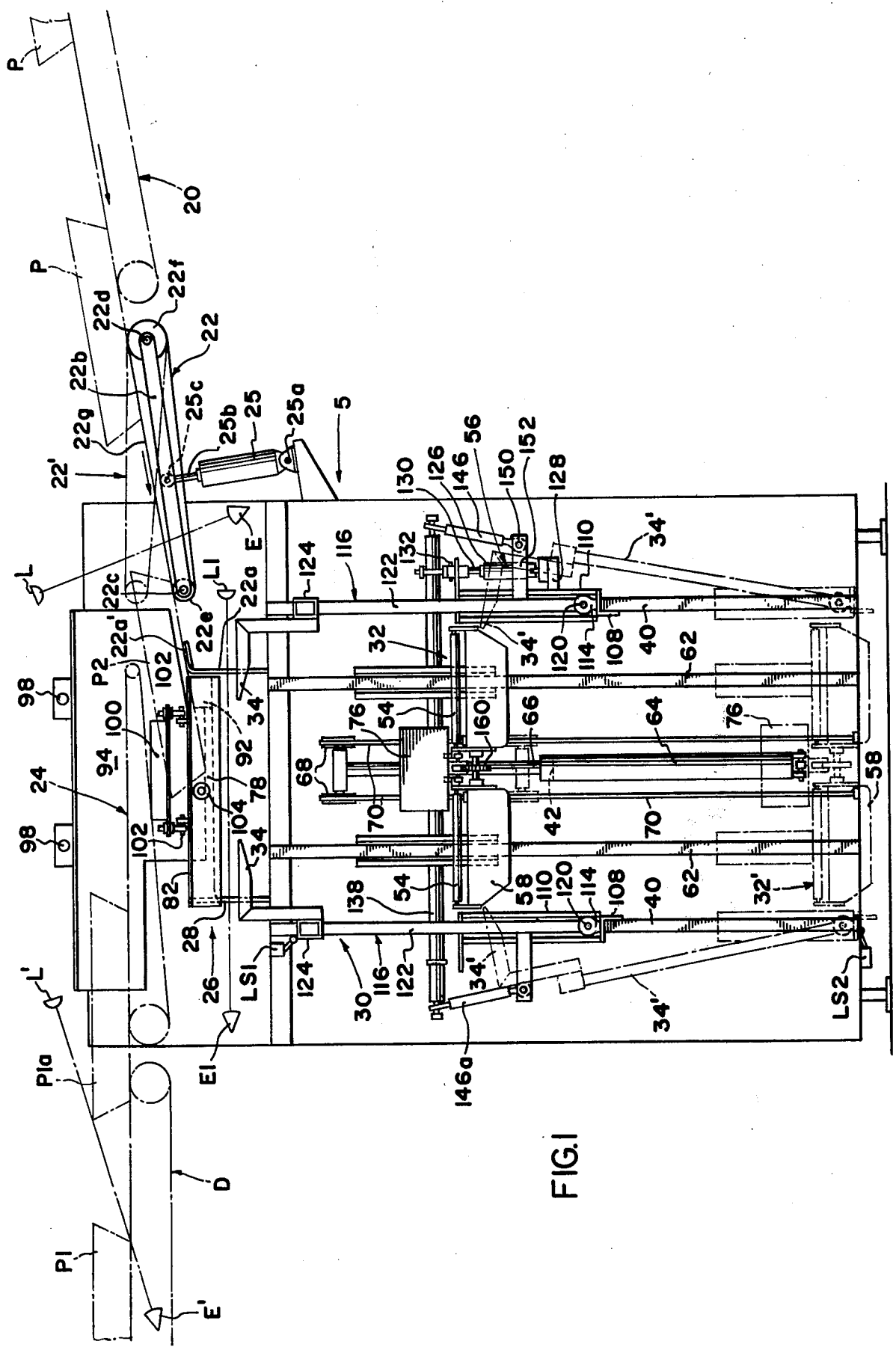
FIG. 1 is a side elevation, with certain parts omitted, of a stacking apparatus embodying the present invention.

Referring first particularly to FIG. 1, apparatus embodying the invention is illustrated in a form employed to stack baking pans P. The pans, which will nest, one within the other, when vertically stacked, are fed to the apparatus via an elevated infeed conveyor designated generally 20. Extending from the discharge end of conveyor 20 is a relatively short diverter conveyor 22, operable when in the full line position shown in FIG. 1, to feed pans P into the stacking position. Conveyor 22 may alternatively be located in the elevated position shown in broken lines in FIG. 1 at 22' to, on demand, divert incoming pans P directly to an upper endless conveyor designated generally 24, pans so diverted being discharged from the apparatus along the path of pans P1 and P1a as shown in FIG. 1 to a downstream discharge conveyor D which leads to machinery in the bakery production line which utilizes pans, such as dough dividers and depositors.

A double acting, fluid pressure operated cylinder or motor 25 pivotally mounted at 25a on the frame F of the machine and having a piston rod 25b secured pivotally to endless conveyor guide support 22b at 25c moves the conveyor 22 upwardly and downwardly. The conveyor 22 further comprises front and rear shafts 22c and 22d respectively on which sprockets or sheaves 22e and 22f respectively are mounted to support endless member 22g. The supports 22b and 22c are connected for raising and lowering movement about shaft 22d as a pivot.

Provided to sense the presence of a pan on conveyor 22 is an electric eye E cooperating with a light source L and downstream of conveyor 24 is a second electric eye E' cooperating with a second light source L' at discharge conveyor D. When the light source to eye E' is blocked for more than a predetermined time, the demand for pans downstream of the pan stacking unit is satisfied and pans on conveyor 22 will be delivered to the stacker for stacking.

In FIG. 1, a pan P2 which is to be stacked by the apparatus is shown at an instant when the pan is partially discharged from the conveyor 22 and partially received by what will be referred to as a catcher mechanism designated generally 26. The catcher mechanism 26, which will be described in greater detail below, functions to temporarily support the pan P2 being fed into the stacking apparatus to carry the pan in movement beyond the discharge end of conveyor 22 until the leading end of the pan P2 engages a stop plate 28. Stop plate 28 is located to be engaged by the leading end of the pan at the time the trailing end of the pan has cleared conveyor 22 and its continuation support generally designated 22a. When the leading end of the pan engages stop plate 28, the trailing end of the pan falls to engage cam surfaces to be described on catcher mechanism 26 to cause the mechanism to release the pan to permit the pan to drop freely, by gravity, either onto a first stage support mechanism designated generally 30 (if the pan is the first pan in a stack being formed) or into the uppermost pan in a stack of pans being formed. The location of stop plate 28 thus establishes the position of the left-hand side of a stack of nested pans being formed by the apparatus as viewed in FIG. 1.

To form or assemble a stack of pans P, the pans P are fed in succession to the apparatus along the infeed conveyor 20 from right to left as viewed in FIG. 1. The diverter conveyor mechanism 22, to be described in more detail later, is preferably driven at a speed greater than that of the infeed conveyor 20 to separate the pans P and develop gaps of predetermined length between them, dependent on pan length. The pans normally proceed along infeed conveyor 20 in substantially head to tail abutment, as the pans enter the stacking apparatus. At the commencement of the formation of a stack of pans, the parts of the apparatus are in the position shown in FIG. 1, with the first stage support mechanism 30 located at its uppermost limit of movement, closely underlying catcher mechanism 26, and a second stage support mechanism, designated generally 32, also being located at its uppermost limit of movement, as shown in FIG. 1. The first pan P2 of the stack is discharged from diverter assembly sections 22 and 22a to slide laterally across catcher mechanism 26 from right to left as viewed in FIG. 1 until the leading or left-hand end of the pan P2 strikes catcher plate 28. At this time, as described above, the trailing end of the pan has cleared the discharge end of the member 22a, and, upon falling to engage catcher 26, the trailing end of the pan engages cam surfaces on the catcher mechanism which cause the catcher mechanism 26 to spread and drop the pan freely from the catcher mechanism onto the inwardly projecting support fingers 34 of the first stage support mechanism 30. The position of stop plate 28 is adjustable toward and away from conveyor 22 to a position which depends upon pan length, and the trailing end of the pan remains supported upon conveyor 22 and its associated slide support 22a, until the leading end of the pan strikes stop plate 28. The slide 22a, which forms a continuation of diverter conveyor 22, when the latter is in down position, is connected to plate 28 and moves with it when plate 28 is adjusted.

Figure 2:
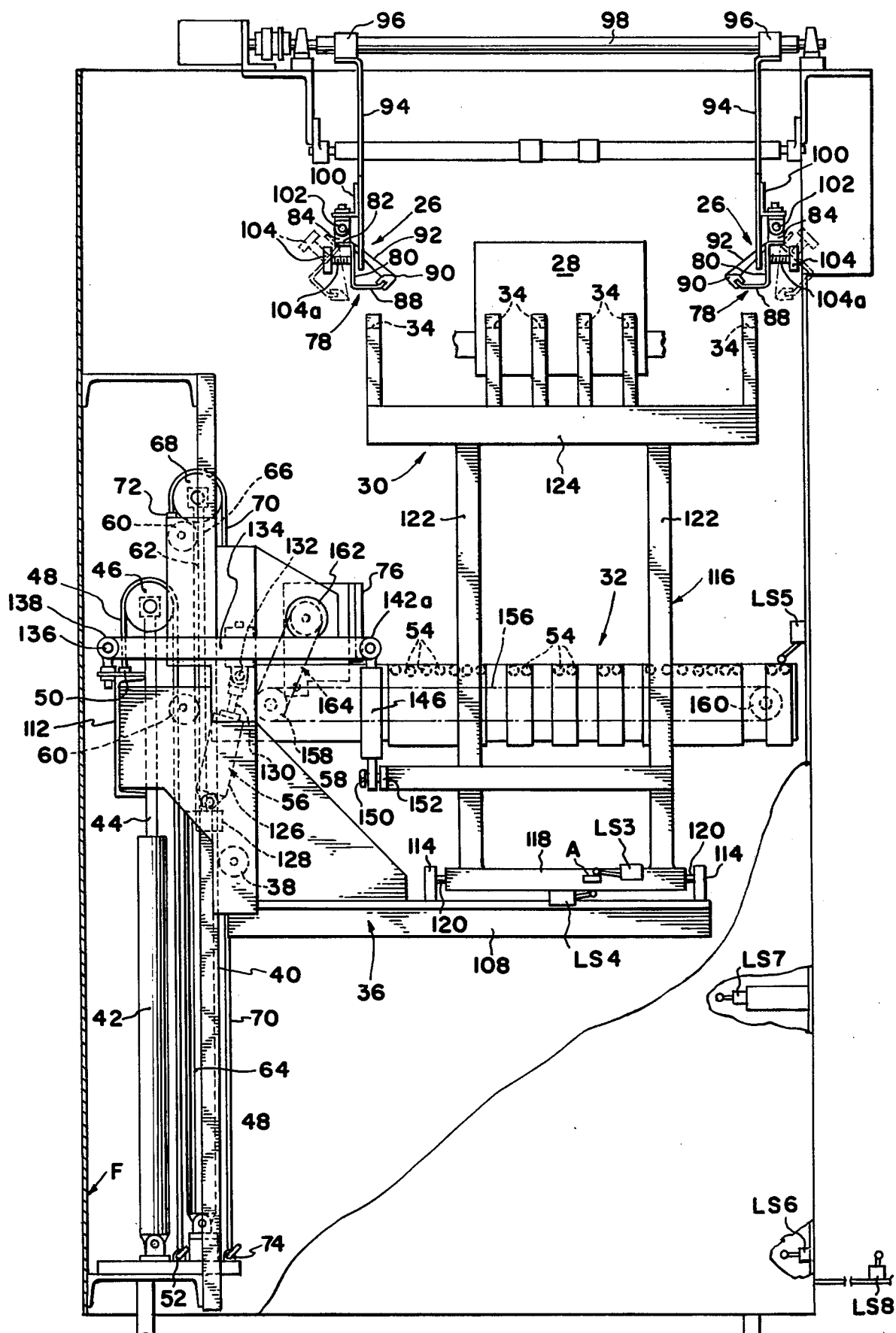
FIG. 2 is an end view, with certain parts broken away or omitted, of the apparatus of FIG. 1.

Referring to FIG. 2, first stage support mechanism 30 includes a carriage portion 36 which is guided in vertical movement at each side of the machine on the fixed frame F of the machine as by rollers 38 engaging a track 40 on the fixed machine frame. The carriage frame 36 of the first stage support mechanism 30 is raised and lowered by means of a hydraulic motor 42 whose piston rod 44 carries a pulley 46 about which is trained a cable 48 coupled to the main frame 36 of the first stage support mechanism as at 50 and to the main machine frame F as at 52. The cable and pulley arrangement employed multiplies the stroke of piston rod 44 by two so that a displacement of one unit by piston rod 44 results in a vertical displacement of two units by carriage 36 of the first stage support mechanism 30.

Figure 3:
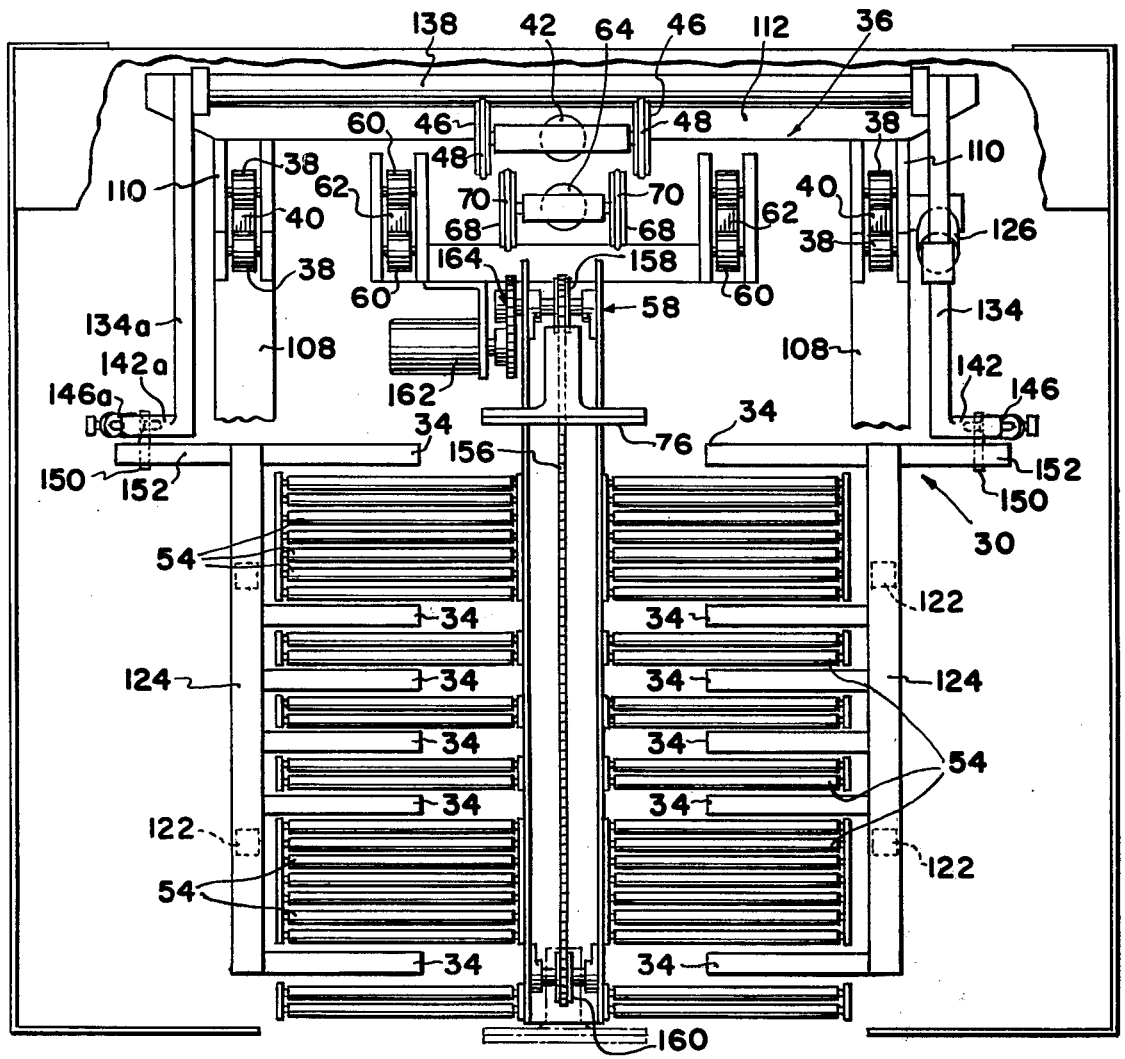
FIG. 3 is a top plan view of the apparatus as shown in FIG. 1, with certain parts broken away or omitted, of the apparatus of FIG. 1.

Returning to FIG. 1, when the first pan P2 of the stack to be formed drops onto support fingers 34 of first stage support mechanism 30, the pan blocks the light beam between a light source L1 and an electric eye E1 so long as the pan remains in this position. Blinding of eye E1 actuates a preferably electric control circuit to in turn actuate hydraulic motor 42 to lower the first stage support mechanism 30 until the pan P2 on support fingers 34 clears the light beam from source L1 to electric eye E1. The next pan, being fed by the infeed conveyor system, which passes into the stacking apparatus, and is handled by the catcher mechanism 26 and stop plate 28 as described above, drops into the preceding pan supported on fingers 34, and actuates electric eye unit E1 and the control system to again lower first stage support mechanism 30 until the second pan clears the light source of electric eye E1. This stacking process is cyclically repeated until support fingers 34 of first stage support mechanism 30 are lowered below support rollers 54 of second stage support mechanism 32. As best seen in FIGS. 2 and 3, support rollers 54 are spaced from each other appropriately to permit fingers 34 to pass between rollers 54.

Lowering of first stage support mechanism 30 below the level of support rollers 54 transfers support of the stacked pans to support rollers 54. The control circuit at this time actuates a finger positioning mechanism designated generally 56 on first stage support mechanism 30 to laterally retract support fingers 34 clear of the stack of pans to the position indicated in broken lines at 34' in FIG. 1. Upon retraction of the support fingers to the position shown at 34' in FIG. 1, the first stage mechanism motor 42 is actuated to elevate the first stage support mechanism back to its original elevation closely beneath catcher mechanism 26; however, the fingers 34 are maintained in the laterally retracted stack clearing position for the time being.

Referring again to FIG. 2, the second stage support mechanism 22 includes a main carriage portion 58 which likewise is guided for vertical movement on the main frame F of the machine at each side thereof, as by rollers 60 guiding on fixed track 62. As was the case with the first stage support mechanism, a hydraulic motor 64 has its piston rod 66 provided with a pulley 68, about which a cable 70 is trained to extend between carriage frame 58 of second stage support mechanism 32 as at 72 and the main frame F of the machine as at 74.

When support of the stack of pans is transferred, as described above, to support rollers 54 of the second stage support mechanism 32, the adding of pans to the stack actuates electric eye E1 as described above, however, actuation of the eye is now employed by the control circuit to control motor 64 which cyclically lowers second stage support unit 32 and the supported stack of pans in synchronism with the addition of pans to the upper end of the stack via conveyor 22.

When a predetermined number of pans have been placed in the stack, motor 64 is actuated to lower second stage support mechanism 32 to its lower end limit of movement, shown in broken lines at 32' in FIG. 1, and, simultaneously with this final lowering of second stage mechanism 32, the finger positioning mechanism 56 is actuated to drive support fingers 34 of the first stage support mechanism back into their pan receiving full line position shown in FIG. 1. The stack of pans carried at this time on the second stage support mechanism 32 is discharged from the apparatus by actuation of a pusher 76 carried on second stage support mechanism 32 in a manner to be described hereinafter. The discharging stack is pushed out of the apparatus as a second stack is starting to be formed on first stage mechanism 30. After the first stack has been discharged, the control system, to be described below, returns the second stage mechanism to its elevated position shown in full lines in FIG. 1.

CATCHER MECHANISM

Figure 4:
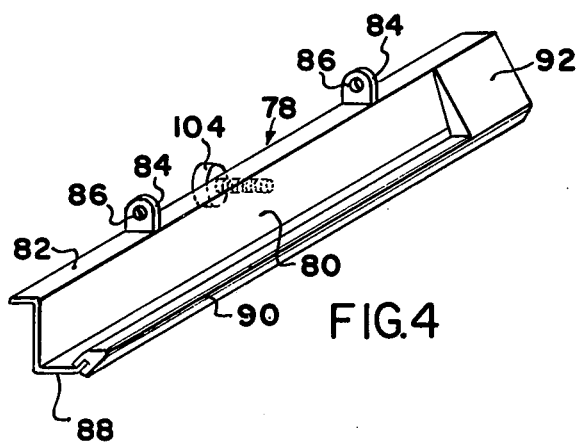
FIG. 4 is a perspective view of a catcher member part employed in the apparatus of FIG. 1.

The catcher mechanism 26 includes a pair of opposed catcher members 78 of generally L-shaped transverse cross section. Referring particularly to FIG. 4 in which only one is shown because they are identical, each catcher mechanism 78 includes a generally vertical web 80 having an outwardly projecting flange 82 at its upper end upon which are mounted a pair of lugs 84, bored as at 86 to constitute a pivotal support for the member 78. A forwardly projecting toe flange 88 is integrally joined to the lower edge of vertical web 80 and may include an upwardly inclined longitudinally extending shoe or wear plate 90. At one end of each member 78, an upwardly inclined cam surface 92 extends between the toe and upper end of the leg of the L-shaped member. Cam surface 92 is located at that end of the catcher member 78 which is adjacent the discharge end of the diverter section 22 when the member 78 is assembled in the machine.

Referring now particularly to FIGS. 1 and 2, the catcher mechanism includes a pair of suspension plates 94 supported by frame F, each having a pair of bushings 96 fixedly secured to the upper edge of the plate, the bushings 96 being slidably supported on a pair of rods 98 fixedly mounted on the machine frame F. This particular mounting enables the transverse spacing between plates 94, as viewed in FIG. 2, to be adjusted to set up the mechanism for pans of specific width.

Brackets 100 (FIG. 2) are fixedly mounted on plates 94 and carry pivot pins 102 which are received within the bored lugs 84 of mounting members 78 to support the members 78 for pivotal movement about horizontal axes on plates 94, between the full line position and broken line position shown in FIG. 2. Threaded counterweights 104 are adjustably mounted on member 78 on threaded rods 104a and are employed to gravitationally bias the members 78 to the full line positions shown in FIG. 2.

With catcher members 78 in the full line positions shown in FIG. 2, a pan being discharged from diverter section 22, as shown in FIG. 1, is projected forwardly and downwardly from the diverter sections 22 and 22a until its forward bottom edge strikes and becomes supported upon the toe sections 90 of the opposed catcher members 78. The cam member 92 of each catcher member 78 is located at the end of the member 78 (FIG. 1) which is adjacent to the diverter section, and hence during the initial approach of the pan to catcher member 78, the bottom of the pan passes above and clear of each cam section 92. To assist the pan in clearing the cam section 92, the ramp support 22a is located in the space between the end of the diverter section 22 and the adjacent ends of catcher member 78. The momentum imparted to the pan by diverter section 22 drives the pan to the left as viewed in FIG. 1, until the lefthand or leading end of the pan strikes stop plate 28. At this time, the trailing end of the pan bottom has cleared diverter section 22 and ramp 22a and thus is entirely unsupported. The trailing end of the pan then drops until it strikes the inwardly inclined cam portions 92 of the catcher member. The weight of the pan is sufficient to cause the pan to slide downwardly on these inclined cam sections 92 to thus swing the catcher members 78 outwardly to the broken line position of FIG. 2. This separating movement of the adjacent opposed catcher members withdraws their support from the pan to permit the pan to drop freely between the now spread catcher members 78 onto support fingers 34 of the first stage support mechanism 30. As soon as the pan has passed below the catcher members 78, by the lowering movement of the first stage support mechanism as described above, the counterweights 104 gravitationally bias the catcher members back into their pan receiving position.

FIRST STAGE SUPPORT MECHANISM

The main frame of the first stage support mechanism 30 is of generally U-shaped configuration when viewed from above and includes a pair of spaced parallel side members 108 each of which, referring to FIG. 2, has bracket plates 110 fixedly secured to one end, the bracket plates 100 being fixedly secured to each other by a transversely extending channel shaped frame member 112. As best seen in FIGS. 1 and 2, the horizontally projecting side frame members 108 are each provided with a pair of spaced lugs 114 which serve as a pivotal support for finger frame assemblies 116, the finger frame assemblies 116 including a horizontally extending frame member 118 (FIG. 2) which is pivotally supported at opposite ends in lugs 114 as at pivots 120. Each finger frame assembly 116 further includes a pair of upright frame members 122 fixedly secured at their lower ends to member 118 and at their upper ends to a horizontal extending cross member 124 upon which the support fingers 34 are fixedly mounted.

Mechanism for swinging finger frame assemblies 116 about pivots 120 between the pan supporting position shown in full line in FIG. 1 and the stack clearing position indicated in broken line in FIG. 1 includes a hydraulic motor 126 whose cylinder is pivotally mounted upon a bracket 128 fixedly secured to one of the frame brackets 110. The piston rod 130 of motor 126 is pivotally connected as at 132 (FIG. 2) to the central portion of a link 134. One end of link 134 is pivotally mounted as at 136 upon cross frame member 112, the pivot 136 being constituted by a shaft 138 which, (see particularly FIG. 3), extends transversely of the machine and supports a second link 134a, identical to link 134.

As best seen in FIG. 3, the ends of links 134 and 134a remote from their common supporting shaft 138 are formed with outwardly projecting extensions 142, 142a which serve as pivotal mounts for drive links 146, 146a. Referring to FIG. 2, drive link 146 is pivotally connected at its lower end as at 150 to a crank arm 152 (see FIGS. 1 and 3) which is fixedly secured to and projects outwardly from finger frame 116. As best seen in FIGS. 1 and 3, a similar connection is made from link 146a to the finger frame at the opposite side of the machine.

Referring first to FIG. 2, it is seen that if hydraulic cylinder 126 is actuated to retract its piston rod 130, link 134 (and link 134a) will be swung downwardly about pivot 136, thereby driving the outer ends of these two links downwardly to drive drive links 146 and 146a downwardly. Referring now to FIg. 1, it is seen that if the links 146 and 146a are driven downwardly, downward movement of crank arm 152, rigidly secured to the finger frame 116, will cause finger frame 116 to pivot outwardly about its pivot 120 to swing the support fingers 34 on the opposed finger frames 116 outwardly away from each other to the retracted configuration indicated in broken line in FIG. 1. Subsequent extension of the piston rod 130 of drive motor 126 will drive the finger frames back toward each other to the full line position shown in FIG. 1.

The control circuit is so arranged that movement of the finger frames 116 from the article supporting position to the outward stack clearing position is accomplished when the first stage support mechanism 30 has reached its lower end limit of movement. A control circuit, in a manner to be described hereinafter, maintains the finger frames in their outwardly spread, inoperative positions while the first stage support assembly 30 is returned to its upper elevated position. Actuation of motor 126 to restore the finger frames to their article supporting position is initiated in the control circuit in response to the lowering of the second stage support mechanism 32 to its lowered, stack discharging position.

SECOND STAGE SUPPORT MECHANISM

As previously described, frame 58 is guided in vertical movement on the main machine frame as by rollers 60 guided in tracks 62. Hydraulic motor 64 whose piston rods 66 carries a pulley 68 engaged with a cable 70 is employed to raise and lower frame 58 relative to the main machine frame.

Frame 58 further supports a pusher 76 (FIG. 3) slidably supported on frame 58 for movement from left to right or vice versa as viewed in FIG. 2. As best seen in FIGS. 1 and 3, pusher 76 moves laterally across the central portion of the supporting surface defined by rollers 54. The pusher is coupled to a chain 156 operatively trained about a pair of end sprockets 158, 160 which are rotatably mounted on the frame 58 of mechanism 32. A drive motor 162 is mounted upon frame 58 and is coupled through a chain and sprocket mechanism designated generally 164 to drive sprocket 158.

After support of a stack of pans has been transferred to the second stage support mechanism 32, with the mechanism 32 located in its elevated position shown in full line in FIG. 1, the support platform defined by rollers 54 is lowered in step-by-step movement in synchronism with the addition of pans to the stack as detected by electric eye E1. The control system is normally set to indicate the completion of a stack of a selected number of pans by the engagement of frame 58 with the striker of a limit switch mounted on the main machine frame F at an appropriate elevation, this elevation being located at some distance above a lower limit of movement of second stage mechanism 32. Upon the loading of the final pan into the stack supported upon second stage mechanism 32, the control circuit transfers control of the second stage mechanism motor 64 from electric eye E1 and causes the motor to drop mechanism 32 in continuous movement to its lower end limit of movement. The purpose of completing the stack before mechanism 32 has reached its lower end limit of movement is so that the assembly of a second stack of articles can commence during that period of time while the completed stack is being discharged from the apparatus. The control circuit is so arranged that when the stack is completed and the second stage mechanism begins to drop in continuous movement toward its lower end limit of movement, motor 126 of the first storage mechanism, which is at this time at its upper end limit of movement with its support fingers retracted, is operated to drive the support fingers 34 into their article supporting position so that the pan following the final pan of the completed stack into the apparatus becomes the first pan of the next stack. Assembly of the second stack thus commences while second stage mechanism 32 is carrying the completed stack to the lower end limit of movement for subsequent discharge by appropriate actuation of motor 162 to translate pusher 76 across a platform defined by rollers 54 to discharge the completed stack from the machine. As soon as the stack is discharged, pusher 76 is retracted and second stage mechanism 32 is returned to its upper end limit of movement to await receipt of the stack being formed at this time on the first stage support mechanism.

CONTROL SYSTEM

In a typical electrical control system, first stage motor 42, second stage motor 64, finger actuating motor 126 and pusher actuating motor 162 are respectively actuated by solenoid operated four-way reversing valves employed in a conventional manner to make the appropriate connections between the respective motors and a source of fluid pressure and sump. Energization of the various valve actuating solenoids is accomplished by an electric control circuit which includes various limit switches, electric eye detectors, and counters to initiate the appropriate control actions in response to the movement of articles or various parts of the apparatus. Preferably, a programmable controller such as the Mini-PMC programmable controller sold by Allen Bradley Co. under catalog No. 1755A is employed in the electrical control circuit. Such controllers can readily be programmed in a relatively simple manner to perform a wide variety of control functions.

Figure 5:
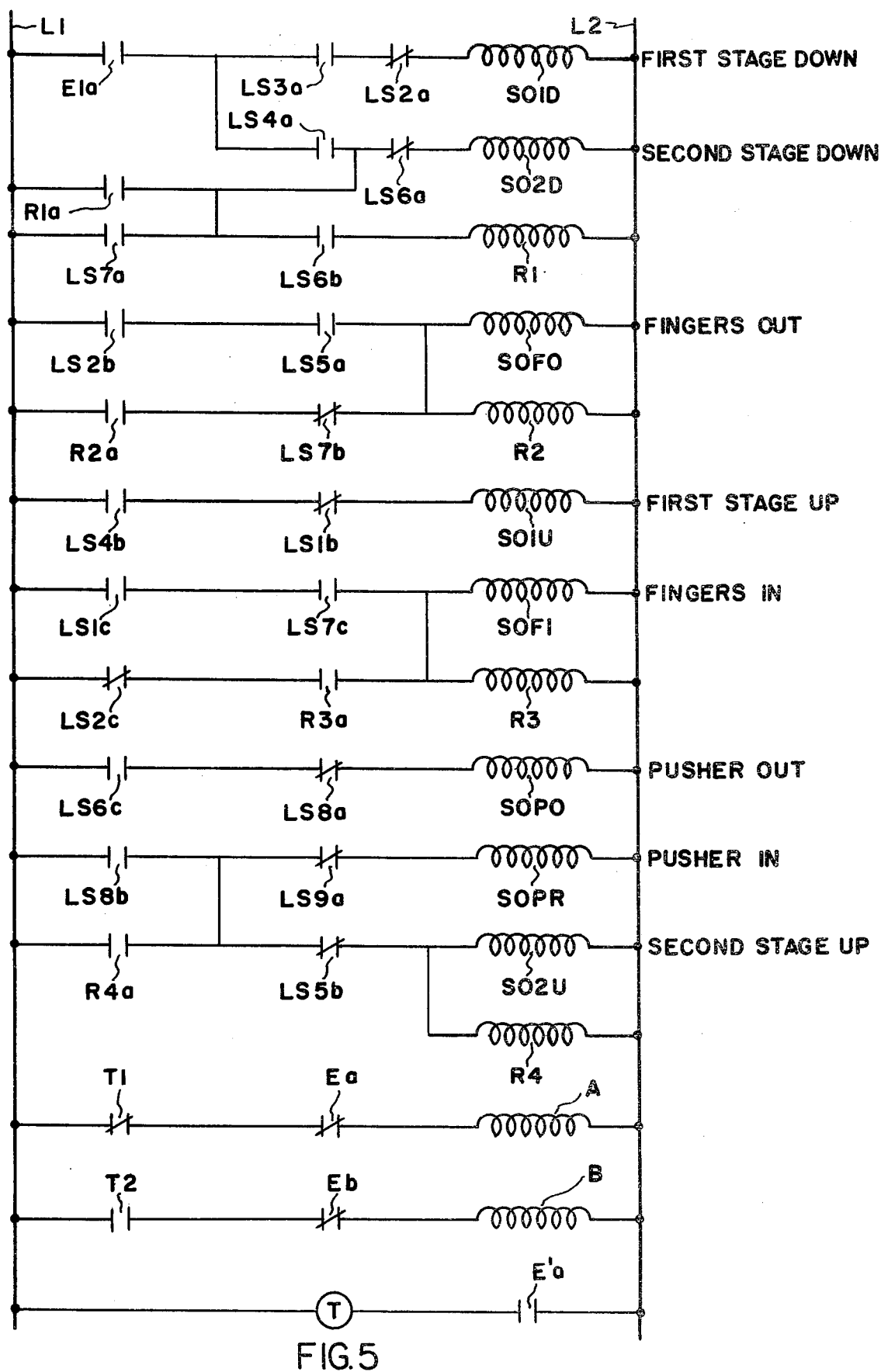
FIG. 5 is a schematic diagram of an exemplary form of electric control circuit for the apparatus of FIG. 1.

For purposes of explanation, however, an extremely simplified form of electrical control circuit is shown in FIG. 5 to indicate the manner in which control circuit functions.

As an initial starting condition, it will be assumed that parts of the apparatus are in the positions shown in full line in FIG. 1 of the drawings. In this condition, the first stage support mechanism 30 is at its upper end limit of movement, with support fingers 34 being located in their inner pan supporting position. Second stage support mechanism 32 is likewise located at its upper limit of movement, with pusher member 76 in its retracted, inoperative position.

In the exemplary form of control circuit illustrated, limit switches LS1 and LS2 (FIG. 1) are mounted on the machine frame to have their strikers depressed when first stage mechanism 30 is in its "up" position (LS1) or its "lower" position (LS2). Referring to FIG. 2, limit switches LS3 and LS4 are located on the main frame 36 of first stage mechanism 30 to respectively detect the finger frame 116 position when the fingers are "in" (LS3) or "retracted" (LS4). Limit switches LS5 and LS6 detect the position of the second stage support mechanism 32 at its "upper" (LS5) or "lower" (LS6) position. Limit switch LS7 is mounted on the machine frame to be engaged by the second stage mechanism when the stack of pans supported on the second stage mechanism reaches a predetermined height. LS7 may be mounted for vertical adjustment on the machine frame to select the number of pans to be included in a stack. A limit switch LS8 is mounted on the discharge conveyor (not shown), which receives the stack of pans ejected by pusher mechanism 76, actuation of the striker of limit switch LS8 signaling the fact that the stack of pans has been discharged clear of the stacking apparatus.

With the first stage raised and support fingers 34 in their "in" position, and second stage mechanism 32 at its "elevated" position with pusher 76 retracted, energization of the control circuit by actuation of a suitable start button (not shown) conditions the control circuit to commence a stacking cycle.

The pans are fed by the infeed conveyor onto diverter section 22 which feeds the pan into catcher mechanism 26 which, as described above, drops the first pan onto the support fingers 34. As the pan drops onto fingers 34, it blocks the light beam from light source L1 to electric eye E1, thus closing the contacts E1a of the control circuit of FIG. 5. Closure of contacts E1a completes a circuit through solenoid SO1D between supply lines L1 and L2 via contacts LS3a (closed because the fingers are in their "in" positions) and normally closed contact LS2a which are closed at this time because the first stage mechanism is not at its lower position. Solenoid SO1D positions the valve controlling the first stage lift motor 42 to cause motor 42 to index the first stage mechanism 32 downwardly until the pan supported on fingers 34 clears the electric eye beam, at which time contacts E1a open to deenergize solenoid SO1D.

A similar cycle is repeated as successive pans are fed into the apparatus and added to the stack until the first stage mechanism reaches its lowermost position. When the first stage mechanism reaches its lower limit of movement, the striker of limit switch LS2 is engaged and actuated to close contacts LS2b and to simultaneously open normally closed contacts LS2a.

Closure of contacts LS2b energizes solenoid SOSO via contacts LS5a, which are closed at this time because second stage mechanism 32 is at its upper limit of movement and the striker of limit switch LS5 is actuated. Solenoid SOSO, when energized, actuates the finger frame operating motor 126 to retract its piston rod, thereby swinging the fingers 34 clear of the stack to the broken line positions shown in FIG. 1. When the fingers are fully retracted, contacts LS3a are opened and contacts LS4a are closed. Closure of contacts LS4a conditions solenoid SO2D to be energized under the control of electric eye contacts E1a via normally closed contacts LS6a, which are closed at this time because the second stage mechanism is not at its lower end limit of movement. Solenoid SO2D, when energized, causes the second stage lift motor 64 to lower the second stage. With contacts LS4a and LS6a closed, the cyclic interruption of the electric eye beam by pans being added to the stack actuates the electric eye contacts E1a which now cyclically actuate solenoid SO2D to actuate the second stage lift motor 64 in downward indexing movement as pans are added to the stack.

When the second stage mechanism is lowered to a position indicating the stack to be complete, the second stage mechanism actuates limit switch LS7 to close contacts LS7a which energizes a lock-in relay R1 via normally closed contacts LS6b, closed at this time because the second stage is not at its lower end limit of movement. When relay R1 is energized, it closes contacts R1a which bypass the electric eye contacts E1a and contacts LS4a to maintain solenoid SO2D energized, causing the second stage mechanism to be continuously lowered by the second stage lift motor 64 until the second stage reaches its lower end limit of movement, at which time contacts LS6a and LS6b open to deenergize solenoid SO2D and relay R1. Contacts R1a also lock in relay R1 during this downward movement of the second stage.

When support fingers 34 are retracted by the previously described actuation of the finger positioning motor 126, contacts LS4b close, as soon as the fingers 34 are fully retracted, to energize solenoid SO1U via normally closed contacts LS1b to actuate the first stage lift motor 42 to raise the first stage support mechanism 30 to its upper limit of movement. When the first stage mechanism reaches its upper limit of movement, contacts LS1b open to deenergize solenoid SO1U. Fingers 34 remain in their retracted stack clearing position until limit switch LS7, as described above, is actuated by the second stage mechanism upon the completion of the assembly of the stack.

At the completion of the stack, contacts LS7c are closed, and contacts LS1c are likewise closed at this time because the first stage is back at its upper position. Closure of these latter two contacts energizes solenoid SOSI which actuates to return fingers 34 to their inner stack supporting positions to catch the next subsequent pan fed into the machine to begin forming a second stack while the second stage mechanism is being lowered to its lower end limits of movement to discharge the assembled stack from the apparatus. A control relay R3 is connected in parallel with solenoid SOSI to lock the finger positioning solenoid SOSI in its energized position via contacts R3a and normally closed contacts LS2c, which are closed at all times when the first stage mechanism is away from its lower end limit of movement.

When the second stage mechanism reaches its lower end limit of movement, contacts LS6c are closed to energize motor 162 of the pusher mechanism via solenoid SOBO to actuate pusher 76 to push the completed stack from the lowered second stage mechanism. When the stack finally clears the apparatus, it actuates limit switch LS8 to open normally closed contacts LS8a, thereby deenergizing the pusher out actuating solenoid, and simultaneously closing contacts LS8b. Closure of contacts LS8b simultaneously energizes solenoids SOPR, SO2U, and a lock-in relay R4. Solenoid SOPR, when energized, actuates the pusher motor to retract pusher 76 to its normal inoperative position. When the pusher reaches its inoperative position, it actuates a limit switch LS9 to open contact LS9a to deenergize solenoid SOPR.

Solenoid SO2U, when energized, conditions the second stage lift motor 64 to stroke upwardly to return the second stage mechanism to its normal upper position. Solenoid SO2U remains energized until the second stage mechanism arrives at its uppermost position, at which time limit switch LS5 is engaged to open its normally closed contact LS5b to deenergize solenoid SO2U and a lock-in relay R4. Lock-in relay R4, when energized, closes lock-in contacts R4a which bypass contact LS8b to maintain solenoids SOPR and SO2U energized in the event the ejected stack should move beyond the stack clear detecting limit switch LS8 before the pusher is fully retracted and the second stage has been returned to its uppermost limit of movement.

As described above, a second stack is being formed on the first stage mechanism, from that point in the cycle described previously when the first stack is completed and the second stage, with the completed stack, begins to move toward its lower end limit of movement for the subsequent discharge of the stack and the restoring of the second stage to its original upper end limit of movement.

Also provided in the circuit (see the lower end thereof) are solenoids A and B which are the advance and retract solenoids respectively for the conventional cylinder 25 controlling diverter conveyor 22. The eye E has contacts Ea and Eb in series with the solenoids A and B respectively and a conventional timer T in series with contacts E1a of eye E' has contacts T1 and T2 also in series with the solenoids A and B respectively. Timer contacts T1 in series with solenoid A, and T2 in series with solenoid B, will not be operated unless the timer T is energized for a predetermined period, i.e., one and one-half seconds to indicate that pans have piled up on conveyor D and future pans proceeding to conveyor 22 should be stacked. Moreover, so long as the eye E light path is broken by a pan on conveyor 22, the conveyor 22 cannot be moved so that any pan in a forward position on conveyor 22 discharges from conveyor 22 before conveyor 22 shifts. Assuming conveyor 22 is in the up (broken lines) position, pans feed along conveyors 94 and D and eye E' is now blocked for a long enough period to change the position of conveyor 22. When pans pile up on conveyor D the eye E' will be blocked for a longer period than the predetermined period chosen and contacts T1 and T2 will open and close respectively. Assuming eye E is not at the time blocked, solenoid A will be deenergized, and solenoid B energized to shift conveyor 22 to the down position. Timer T is an automatically resetting timer. The gap forward of conveyor 22 is selected with respect to the length (center of gravity) of the pans P such that a continuous flow of pans P can be maintained regardless of the position of conveyor 22.

The exemplary control circuit illustrated, of course, for the sake of clarity, omits many conventional elements employed in the actual machine, such as manual indexing buttons which can be employed to manually position the various elements as desired. Moreover, it is to be understood the positions of the various limit switches can be adjusted to process either bread or bun pans.

THE OPERATION

The manner in which articles are stacked is schematically illustrated in sequential views in FIGS. 6–12.

Figure 6:
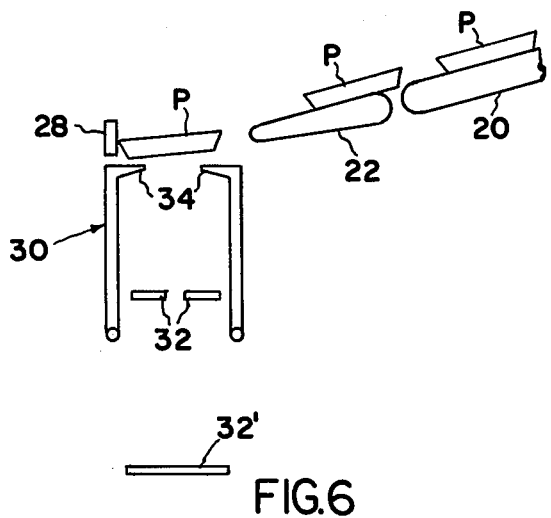
FIGS. 6–12 are schematic side elevational views similar to FIG. 1, sequentially illustrating the operation of the system.

Referring first to FIG. 6, portions of the first stage mechanism 30 and second stage mechanism 32 are shown in the positions occupied at the commencement of a stacking operation. Both of the first stage mechanism 30 and second stage mechanism 32 are located in their uppermost limit of movement with the first stage mechanism 30 located in its operative position with fingers 34 in their inner pan receiving position. Pans P to be stacked are being fed to the apparatus by infeed conveyor 20 and diverter section 22 with the first pan P of the stack being shown in FIG. 6 just as it is striking fixed stop 28. For purposes of clarity, the gravity operated catcher mechanism 24 has not been shown in the schematic views.

Figure 7:
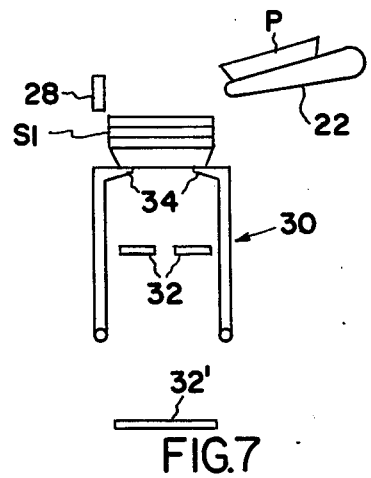

In FIG. 7, the apparatus is shown with a first group of pans assembled into the partial stack S1 supported upon the first stage mechanism 30 which, as compared to the position shown in FIG. 6, has been indexed to lowered positions to keep the uppermost pan in the stack S1 below the path of movement of subsequent pans P into the stack.

Figure 8:
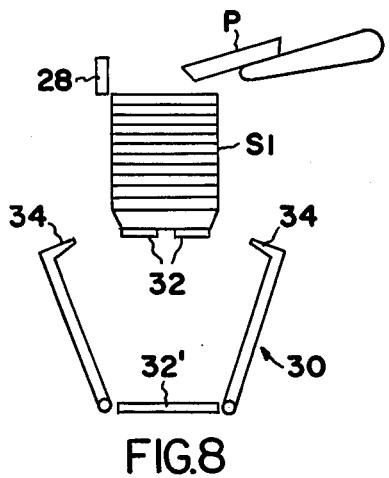

In FIG. 8, first stage mechanism 30 has been lowered to its lowermost limit of movement, and the support of the partial stack of pans S1 has been transferred to second stage mechanism 32. The first stage mechanism has been actuated to retract its fingers 34 clear of the partial stack S1. As indicated in FIG. 8, pans P continue to be fed into the apparatus.

Figure 9:
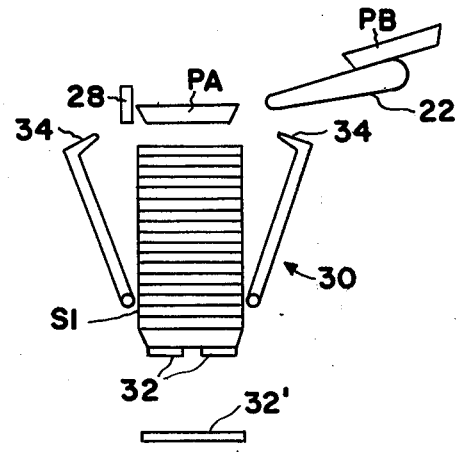

In FIG. 9, the apparatus is shown at the instant of the final pan PA of a stack is striking fixed stop 28. As compared to FIG. 8, it will be observed that the first stage mechanism 30 is, at this time, located at its upper limit of movement, however, the support fingers of the first stage mechanism are still retracted clear of the stack. The next subsequent pan PB is just entering diverter section 22.

Figure 10:
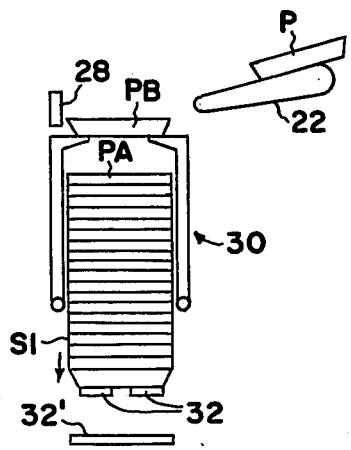

In FIG. 10, the second stage mechanism is being lowered in continuous movement, and the first stage mechanism has returned to its inner pan supporting position in time to receive the first pan PB of the next subsequent stack to be formed. The completed stack S1 is being lowered in continuous movement by second stage mechanism 32 to the outfeed conveyor 32'.

Figure 11:
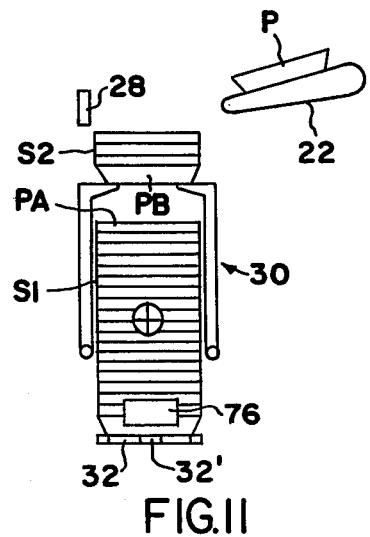

In FIG. 11, the second stage mechanism has been lowered to its lower limit of movement and the completed first stack is being pushed by pusher member 76 in a direction away from the observer in FIG. 11 onto outfeed conveyor 32'. While the first assembled stack S1 is discharging, it will be observed that a partial second stack S2 is being assembled on first stage mechanism 30.

Figure 12:
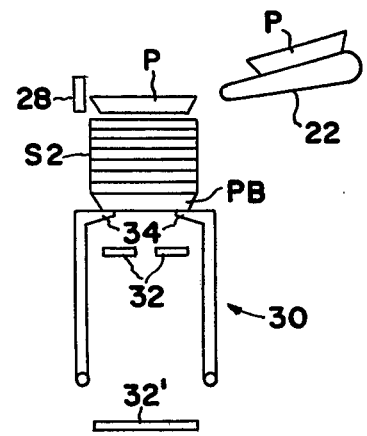

In the next sequential view of FIG. 12, the first assembled stack S1 has been removed from the apparatus by outfeed conveyor 32' and the second stage mechanism 32 has been returned to its upper limit of movement where it awaits receipt of the second partial stack S2 being assembled on the first stage mechanism. The views of FIGS. 7 and 12 show essentially the same stage in the stack forming operation and the apparatus continues to cycle from the FIG. 7 – FIG. 12 stage through the successive steps shown in FIGS. 8, 9, 10, 11 and 12.

With the apparatus, high average stacking rates in the neighborhood of 50 pans per minute are feasible and the fast-acting, low inertia diverter system (22 etc.) can direct pans to the stacking mechanism or to an overhead conveyor without having to stop the flow of pans. Because the catcher 26 which initially receives the pans for stacking is self-releasing, it can operate at a faster rate than a stacker which employs a motor operated releasing system, and in which rate of stack time is sacrificed because of the time delay necessary to the operation of sensors and motors. For example, a motor operated pan-catcher might conceivably take 3/10ths of a second more to operate and this cumulatively would clearly restrict the rate of operation of the stacking machine. Moreover, the gravity operated catcher described is smoother in operation and does not have the problem of the rapid wearing of fast-operating drive linkage.

The present system is also versatile. For instance, the full dead weight of each pan being processed is counter-balanced out, so that essentially cam leverage causes the opening of the catcher arms. Thus, a range of pans of different weight can be handled without changing anything, because it is the dead weight of the entire pan which is counter-balanced out and the full weight of the pan is never a factor until the tail end of the pan drops to the catcher pan mechanism. Finally, it is the kinetic energy of the falling pan acting through the cam leverage which causes the catcher arms 78 to open. In this sense, the catcher is somewhat insensitive to weight and permits a good range of pan weights to be handled without adjustment of the counter-weights 104 along rods 104a. For example, pans in the range of 18 to 32 inches long, and 8 to 32 inches wide, and weighing 8 to 15 pounds can be readily handled. Moreover, the system can be switched from bread pans to bun pans of various heights with no lost time between the completion of one stack of pans and the start of another stack except for any time required for adjusting to any pan length and width changes. Moreover, the system can stack aluminum pans because no magnets are required and pans which are either right-side up or upside down. Minimum machine adjustments are required for pan dimension variations and the machine is a very low maintenance machine.

While one embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

What is claimed is:

1. Pan stacking mechanism comprising infeed means for uninterruptedly feeding baking pans to a stacking station at the upper end of a vertical path; receiving means at said stacking station for receiving a pan from said infeed means, aligning the received pan with said vertical path and dropping said pan; first pan stack support means mounted for raising and lowering movement along an upper section of said path; said first pan stack support means having first opposed pan engaging means movable from opposite sides of the path between an operative position wherein said pan engaging means project into said path to support the opposite ends of pans thereon and laterally retracted inoperative positions clear of said path; means for moving said opposed pan engaging means laterally; means mounting said first pan engaging means for vertical indexing travel; first indexing means, operable independently of said means for moving the first pan engaging means laterally, operating discontinuously in increments of vertical travel responsive to the dropping of a pan by said receiving means for lowering said first pan engaging means a predetermined distance equal to the height of a pan to form a stack of pans on said first pan engaging means; second pan support means mounted for raising and lowering movement along a lower section of said path vertically overlapping the lower portion of said upper section, first control means operable upon the lowering of said first support means below the upper end of said lower section of said path for retracting said first pan engaging means laterally to said inoperative position upon transfer of the support of the stack of pans from said first pan engaging means to said second support means; means for returning said pan engaging means to the upper end of said upper section of said path; second indexing means operable discontinuously in increments of vertical travel when a stack of pans is supported on said second support means for lowering said second support means a predetermined distance equal to the height of a pan responsive to the dropping of a pan by said receiving means; second control means operable after the assembly of a stack of a predetermined number of pans on said second support means to restore said first pan engaging means to said operative position; means for discharging stack assembly from the second support means; and means for returning said second support means to raised position.

2. The invention defined in claim 1 wherein said second support means has a path of movement extending below the level of said assembly of a predetermined number of articles thereon and said second control means is operable to lower said second support means to the lower end of said path; and wherein third control means is operable upon the arrival of said second support means at the lower end of said path to discharge the stack of pans from said second support means and upon the completion of the discharge of said stack to raise said second stage to the upper end of said lower section of said path.

3. The invention defined in claim 1 wherein said pan engaging means comprises a pair of opposed upwardly extending finger frame assemblies pivotally mounted at their lower ends on said first support means at opposite sides of said vertical path, pan support fingers at the upper ends of said frame assemblies projecting inwardly toward said path, and positioning means operable to swing said frame assemblies between said retracted position wherein said fingers are clear of said path and said operative position wherein said fingers project horizontally into said path.

4. Pan stacking mechanism comprising infeed means for uninterruptedly feeding baking pans to a stacking station at the upper end of a vertical path; a catcher at said stacking station for receiving a pan from said infeed means, aligning the received pan with said vertical path and releasing said pan; first pan stack support means mounted for raising and lowering movement along an upper section of said path and having pan engaging means movable between an operative position wherein said pan engaging means projects into said path to support pans thereon and a laterally retracted, inoperative position clear of said path; sensing means positioned at a level spaced below said receiving means to sense the presence of a pan just released from said receiving means to said pan engaging means; means mounting said pan engaging means for vertical indexing travel and lateral movement; first indexing means operable discontinuously in increments of vertical travel when said engaging means is in said operative position for lowering said first support means a predetermined distance to form a stack of pans on said first support means; second pan support means mounted for raising and lowering movement along a lower section of said path vertically overlapping the lower portion of said upper section; second indexing means operable discontinuously in increments of vertical travel when the stack of pans is supported on said second support means for lowering said second support means a predetermined distance; circuit means connecting said sensor and first and second indexing means to operate them sequentially under control of said sensor; and control elements connected with said circuit means for disabling said first indexing means and enabling said second indexing means so that the latter succeeds to control by said sensing means after a predetermined indexing of said first indexing means, and control means operable after the assembly of a stack of a predetermined number of pans on said second support means to restore said first pan engaging means to said operative position.

5. The invention defined in claim 4 wherein said receiving means comprises a stop plate extending transversely of the path of movement of articles into said stacking station, said stop plate being located beyond the end of said infeed means by a distance greater than the length of a pan, a pair of catcher members extending along each side of the path of movement of a pan from said infeed means to said stop plate for releasably supporting and guiding a pan in movement to said stop plate, and pan engaged means on said catcher members for causing said catcher members to release a pan.

6. The invention defined in claim 5 wherein said catcher members comprise a pair of spaced opposed elongate members of generally L-shaped transverse cross section mounted for pivotal movement about longitudinally extending horizontal axes normal to said stop plate at opposite sides of the path of said pan, biasing means pivotally biasing said catcher members to a normally maintained position wherein the lower webs of said L-shaped members project horizontally inwardly from said members to slidably underlie and guide a pan discharged from said infeed means toward said stop plate, and cam means at the ends of said members constituting said pan engaged means operable when engaged by a pan discharged from said infeed means to pivot said members outwardly against the action of said biasing means to a position wherein said lower webs are withdrawn from beneath said pan.

7. The invention defined in claim 6 wherein said pan passes from said infeed means to said catcher members along a downwardly inclined path, said cam means being located at the ends of said catcher members closest to said infeed means and lying below said inclined path.

8. In a pan stacking apparatus having pan support means for lowering pans in a stack along a fixed vertical path, and feeding means for feeding pans in succession to a receiving location on said fixed path for addition to the top of said stack; the improvement wherein said feeding means comprises pan conveying means having a downwardly inclined discharge end for receiving a pan adjacent said receiving location and moving it on an inclined path out beyond said end with its trailing end supported by the discharge end, a catcher operable to receive and support the front end of a pan discharged from said conveying means, said pan passing from said infeed means to said catcher along a downwardly inclined path; and cam means mounting said catcher for self-releasing movement when the weight of the trailing end of the pan is released from the conveying means to shift said catcher outwardly away from said pan and drop said pan from said receiving location; said cam means being located at the end of said catcher closest to said infeed means and lying below said inclined path.

9. The combination of claim 8 wherein the catcher comprises a pair of opposed members defining opposite sides of the receiving location in one position and being movable to pan releasing positions outward thereof; and adjustable means normally biasing said opposed members to said one position.

10. In an article stacking apparatus having article support means for lowering articles in a stack along a fixed vertical path, and feeding means for feeding articles in succession to a receiving location on said fixed path for addition to the top of said stack; the improvement wherein said feeding means comprises article conveying means having a discharge end adjacent said receiving location, a pair of spaced guide members defining opposed sides of said receiving location operable to engage and support opposed sides of an article discharged from said conveying means, and self-releasing means on said guide members operable when engaged by an article to shift said guide members outwardly away from said article to drop said article from said receiving location, said conveying means comprising an end section inclined downwardly to said discharge end, said guide members comprising elongate members of generally L-shaped transverse cross section supported for pivotal movement about parallel horizontal axes extending along the upper end of the L section, said members being gravitationally maintained in a position wherein the vertical legs of the L section slidably engage opposite sides of an article discharged from said conveying means and the horizontal legs of the L section underlie the bottom of the article, said horizontal legs being spaced below the discharge end of said conveying means whereby the forward end of an article being discharged from the inclined end section of said conveying means engages and slides along said horizontal legs, and said release means comprising an inclined plate means extending between the distal ends of said L section at the ends of said members adjacent said discharge end to be engaged by the trailing end of said article as the article leaves said end section of said conveying means.

11. Pan stacking apparatus comprising an infeed conveyor; means defining a vertical lift shaft; a catcher mounted above said shaft and operable to receive pans from the infeed conveyor and release them; first pan support means mounted for vertical movement in the upper portion of said lift shaft; second article support means mounted for vertical movement in a lower portion of said lift shaft; first control means for discontinuously indexing said first article support means a predetermined distance downwardly upon the discharge of each of a first group of articles into said lift shaft whereby the articles of said first group are successively stacked upon said first support means; second control means actuable when all of said first group of articles are stacked upon said first support means to transfer support of said first group of articles to said second article support means, and third control means for discontinuously indexing said second article support means said predetermined distance downwardly upon the discharge of each of an additional group of articles into said lift shaft to stack the articles of said additional group upon the stacked first group of articles; said first and said third control means comprising a common article position detector means mounted adjacent the top of said lift shaft and operable to generate an indexing signal when the uppermost article in said shaft is above a selected position within said lift shaft; said first and said third control means each further comprising respective first and third indexing signal receiving means connectable to said detector means to receive indexing signals therefrom; and switch means operable by said second control means for selectively connecting one or the other of said signal receiving means to said detector means.

12. Apparatus as defined in claim 11 wherein said common detector means comprises a light source for directing a beam of light across said lift shaft at a selected level and electric eye means mounted to receive said beam of light, said eye means being operable to generate said indexing signal when said light beam is blocked from said eye means.

13. Apparatus as defined in claim 11 wherein said first support means comprises article supporting members movable transversely of said lift shaft between an article supporting position wherein said members project into said shaft and a retracted position wherein said members are withdrawn from said shaft, said second control means being operable when actuated to shift said members from said article supporting position to said retracted position.

14. Apparatus as defined in claim 13 wherein said first article support means is movable between an upper and a lower end limit of movement in said lift shaft, first drive means for driving said first support means between said end limits, said second control means being actuated in response to the arrival of said first support means at said lower end limit, and fourth control means operable upon the movement of said members to said retracted position for returning said first support means to said upper end limit.

15. Apparatus as defined in claim 14 further comprising fifth control means operable upon the accumulation of said additional group of articles upon said second support means for disconnecting said third signal receiving means from said detector means and lowering said second support means while simultaneously restoring said supporting members of said first support means to their article supporting position and connecting said first signal receiving means to said detector means.

16. Apparatus as defined in claim 15 further comprising sixth control means operable to discharge the stack of articles from said second support means and elevating said second support means to a position adjacent said lower end limit of said first article support means.

* * * * *